United States Patent
Ballard et al.

(10) Patent No.: US 7,941,596 B2
(45) Date of Patent: May 10, 2011

(54) LOCATING MEDIA BY CHARACTERISTICS IN STORAGE APPARATUS

(75) Inventors: Curtis C. Ballard, Eaton, CO (US); Mike P. Fleischmann, Fort Collins, CO (US); Kelly J. Reasoner, Fort Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 771 days.

(21) Appl. No.: 11/259,223

(22) Filed: Oct. 26, 2005

(65) Prior Publication Data

US 2008/0125905 A1 May 29, 2008

(51) Int. Cl.
*G06F 13/00* (2006.01)
(52) U.S. Cl. ......... 711/111; 711/161; 709/225; 700/214
(58) Field of Classification Search .................. 711/111, 711/161; 700/213, 214, 245; 369/30.06, 369/30.64, 178.01; 709/225
See application file for complete search history.

(56) References Cited

U.S. PATENT DOCUMENTS

| 5,884,298 | A  | * | 3/1999  | Smith et al.    | 1/1     |
|-----------|----|---|---------|-----------------|---------|
| 6,643,667 | B1 | * | 11/2003 | Arai et al.     | 707/200 |
| 7,548,958 | B2 | * | 6/2009  | Martin et al.   | 709/217 |
| 2002/0156969 | A1 | * | 10/2002 | Tadokoro et al. | 711/111 |
| 2003/0046324 | A1 | * | 3/2003  | Suzuki et al.   | 709/100 |
| 2003/0167327 | A1 | * | 9/2003  | Baldwin et al.  | 709/225 |
| 2004/0044863 | A1 | * | 3/2004  | Trimmer et al.  | 711/161 |
| 2005/0043852 | A1 | * | 2/2005  | Gallo et al.    | 700/214 |
| 2007/0050545 | A1 | * | 3/2007  | Tsuboki et al.  | 711/114 |

* cited by examiner

*Primary Examiner* — Yong Choe

(57) ABSTRACT

Backup storage apparatus and related methods having a controller for controlling and monitoring a robotics assembly that loads and unloads storage media into and from storage devices and an operator control panel coupled to the controller for controlling functions of and displaying information regarding the apparatus. A user interface that is displayable on the operator control panel is operative to allow input of a storage media characteristic, locate media using the input storage media characteristic, and retrieve the location of the desired storage media corresponding to the characteristic that was input.

19 Claims, 4 Drawing Sheets

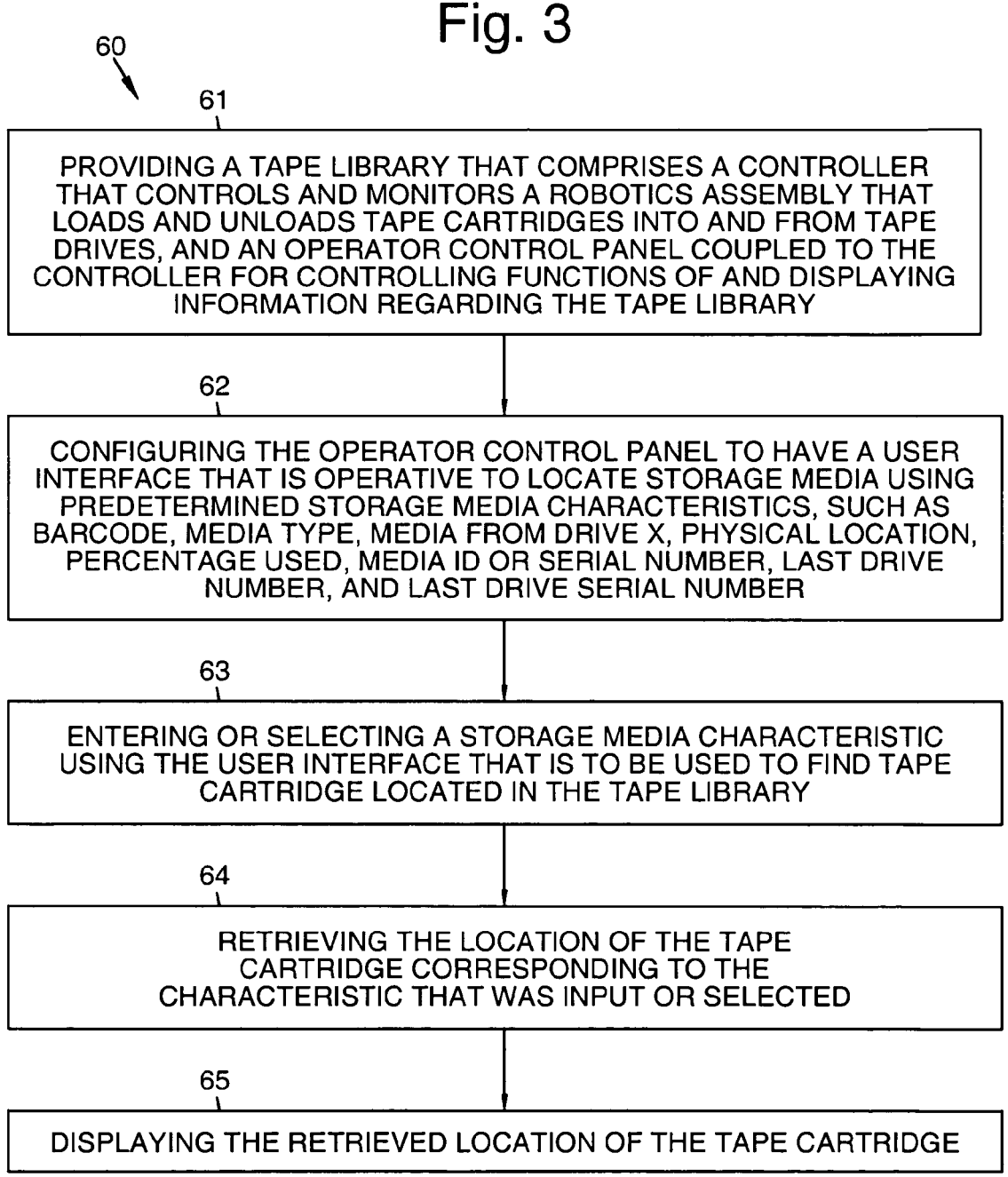

LOCATING MEDIA BY CHARACTERISTICS IN STORAGE APPARATUS

BACKGROUND

Businesses, governmental agencies, learning institutions, and other organizations typically operate computers that are interconnected by a network. Network users often store data on hard drives of network servers. Users also store data on their host computers.

Data stored on the network and/or host computers is typically backed-up periodically to create a copy of the data to prevent it from being lost due to mechanical failure or accidental deletion, for example, and/or to produce an archive of the data. Backup operations typically involve storing a copy of all or a portion of the data files on the network and/or host computers to a backup device such as a magnetic tape library having a plurality of magnetic tape drives.

Digital magnetic tape has long been used for data storage in computer systems. The low cost-per-bit stored, long-term retention capability, and portability of magnetic tape cartridges have made them invaluable for storing large quantities of data generated by businesses.

Tape cartridges are used by automated tape library devices. Tape libraries generally handle many tape cartridges to store very large amounts of data. The tape libraries hold the tape cartridges in predefined positions or media slots. When data is required from a particular tape cartridge, a host system communicates via a Small Computer System Interface (SCSI) bus or a Fibre Channel (FC) fabric, for example, with a controller of the tape library. The controller retrieves the particular tape cartridge from its media slot and places the tape cartridge in a tape drive. The host system may then read from or write to the tape cartridge via the tape drive. Also, the host system may query the controller to determine the number of tape cartridges, tape drives, and robotics mechanisms contained in the tape library to manage the tape library.

There are a number of manufacturers of tape libraries that back up and store large quantities of data to digital magnetic tape cartridges. For example, a StorageWorks brand of tape libraries are manufactured in various sizes and configurations. The number of tape cartridges that can be loaded into such tape libraries varies depending upon model, but may be on the order of 400-500 tapes, for example.

A typical tape library usually has a control and display panel (or operator control panel) where local functions are controlled and where the health of the tape library may be displayed. The display typically presents information about components in the tape library that are built by the original library manufacturer. Value added components may also be installed in the tape library including software tools to aid in the configuration, installation, and management of the tape library.

There are many different ways to identify media, such as tape cartridges, disposed in a tape library, and the ways used by a particular tape library and by independent software vendor (ISV) software are different, making it difficult at times to locate the tape that matches the ISV software's request. It would be desirable to have backup storage apparatus and methods that make it easy to use the same identifier that the ISV uses when selecting media from a control panel (or other user interface) of the tape library.

Conventional tape libraries select media from a front control panel using slot or element identifiers. Some conventional tape libraries may display a barcode and/or the media type after selecting the media, but none allow selection of the media using the barcode or type. It would be desirable to have backup storage apparatus and methods that remedy this problem.

BRIEF DESCRIPTION OF THE DRAWINGS

The various features and advantages of embodiments of the present invention may be more readily understood with reference to the following detailed description taken in conjunction with the accompanying drawings, wherein like reference numerals designate like structural elements, and in which:

FIG. 3 is a flow diagram that illustrates an exemplary method or algorithm for use with backup storage devices.

DETAILED DESCRIPTION

Backup storage apparatus 10 is disclosed and is discussed below in the context of a magnetic tape library 10. However, it is to be understood that the backup storage apparatus 10 is not limited only to magnetic tape libraries, but may be employed in the context of other backup storage devices and systems, including optical drives and hard disk drives, for example.

Figure 1:
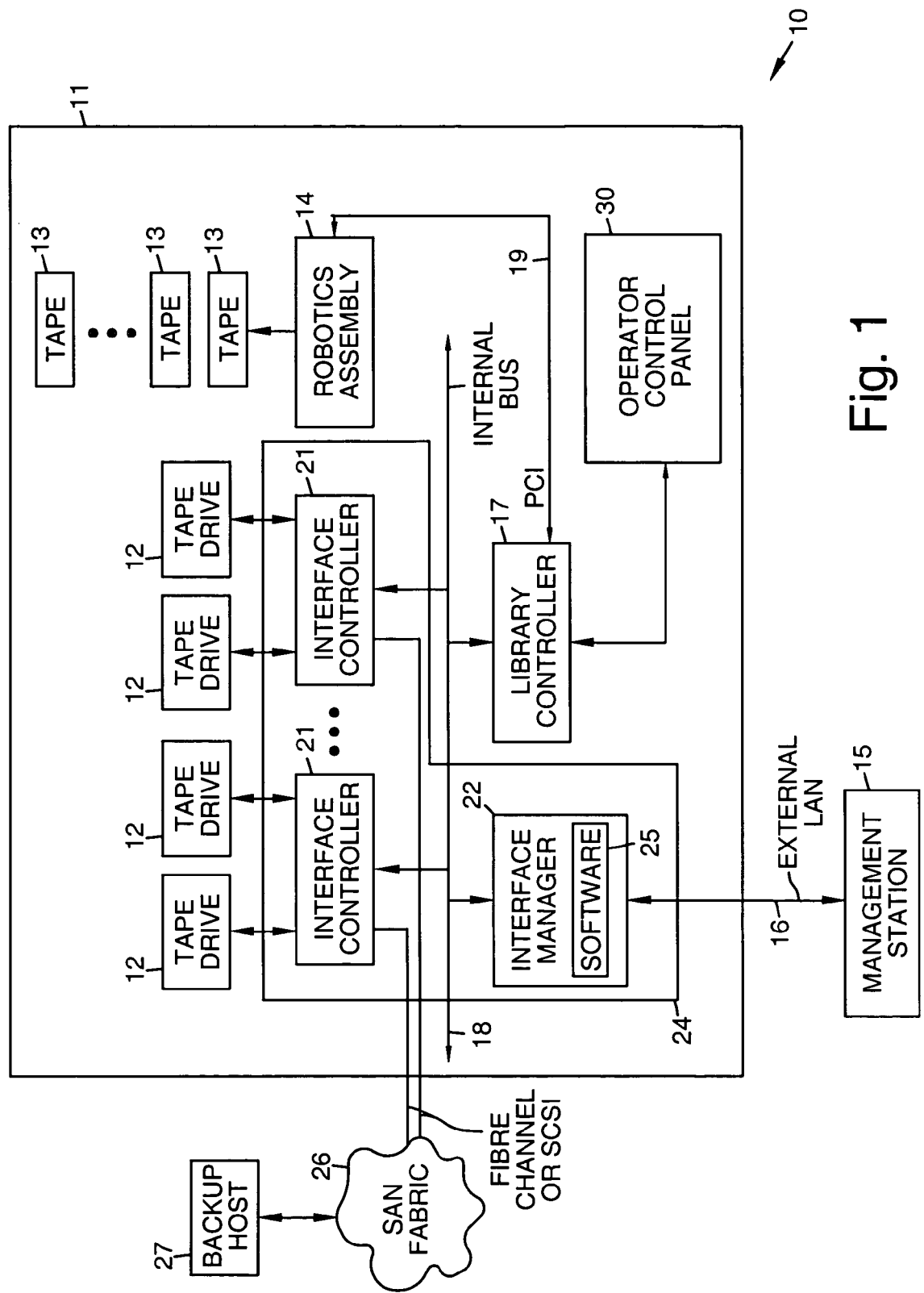
FIG. 1 is a block diagram that illustrates an exemplary tape library.

Referring to the drawing figures, FIG. 1 shows exemplary backup storage apparatus 10 comprising an exemplary tape library 10. The exemplary tape library 10 comprises a housing 11 in which a plurality of tape drives 12 (storage devices 12) are housed. A plurality of tape cartridges 13 (storage media 13) are loaded and stored in the housing 11 and which are manipulated by a robotics assembly 14 to load and unload them into a selected tape drive 12 to store data thereon or retrieve data therefrom. In other types of backup storage apparatus 10, the storage device 12 might comprise an optical disk reader used with optical disk media, or removable hard disk drives, for example.

An external management station 15 communicates with the tape library 10 by way of an external local area network (LAN) 16. The management station 15 is coupled by way of the external LAN 16 to a component 22 of the tape library 10 such as an interface manager 22 or management appliance 22. The interface manager 22 or management appliance 22 includes software tools 25 that aid in the configuration, installation, and management of the tape library 10, and specifically allow configuration and control of value added components 24 of the tape library 10. The interface manager 22 is coupled to an internal bus 18 comprising a communication link 18.

One or more interface controllers 21 may be coupled between selected tape drives 12 and the internal bus 18. The interface controllers 21 provide a communication path for the interface manager 22 to talk to the tape drives 12. The interface controllers 21 also provide a controlled data path between the tape drives 12 and a backup server 27. The backup server 27 communicates with the interface controllers 21 via a Fibre Channel fabric 26, shown in FIG. 1 as a storage area network (SAN) fabric 26, for example. A parallel data bus such as a Small Computer System Interface (SCSI) bus may be used in place of the Fibre Channel fabric 26, but this is not commonly used in current-generation computers.

The interface manager 22 or management appliance 22 and the interface controllers 21 comprise the value added components 24 of the tape library 10, i.e., components that may not be manufactured and installed by the original library manufacturer.

A library controller 17 is coupled by way of the internal bus 18 (communication link 18) to the one or more interface controllers 21 and to the interface manager 22 or management appliance 22. The library controller 17 is also coupled by the way of a private internal bus such as a PCI bus 19 to the robotics assembly 14.

The tape library 10 comprises an operator control panel and display system 30, referred to as an operator control panel 30, which is preferably disposed on a front panel of the tape library 10, for ease of use. The operator control panel 30 controls local functions and displays information regarding the tape library 10. The operator control panel 30 presents information about components in the tape library 10.

The operator control panel 30 comprises a graphical user interface (GUI) that displays library status information and allows a user to access the library menus. These menus allow a user to view or change the library settings, run demonstration programs, and run diagnostic tests, for example. Certain of these menus are illustrated in and are discussed with reference to FIGS. 2a-2d that relate to locating media contained in backup storage apparatus 10 using various characteristics associated with the media 13.

Figure 2A:
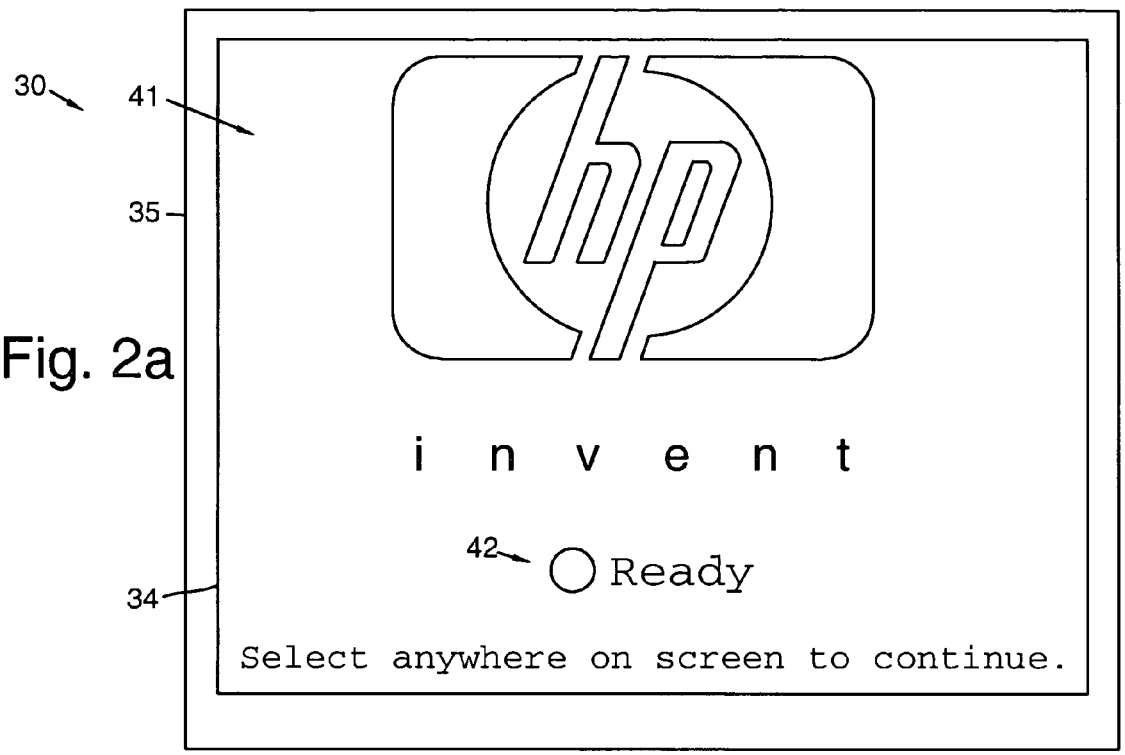
FIGS. 2a-2d illustrate exemplary display screens for locating media in the backup storage device using certain media characteristics.
Figure 2B:
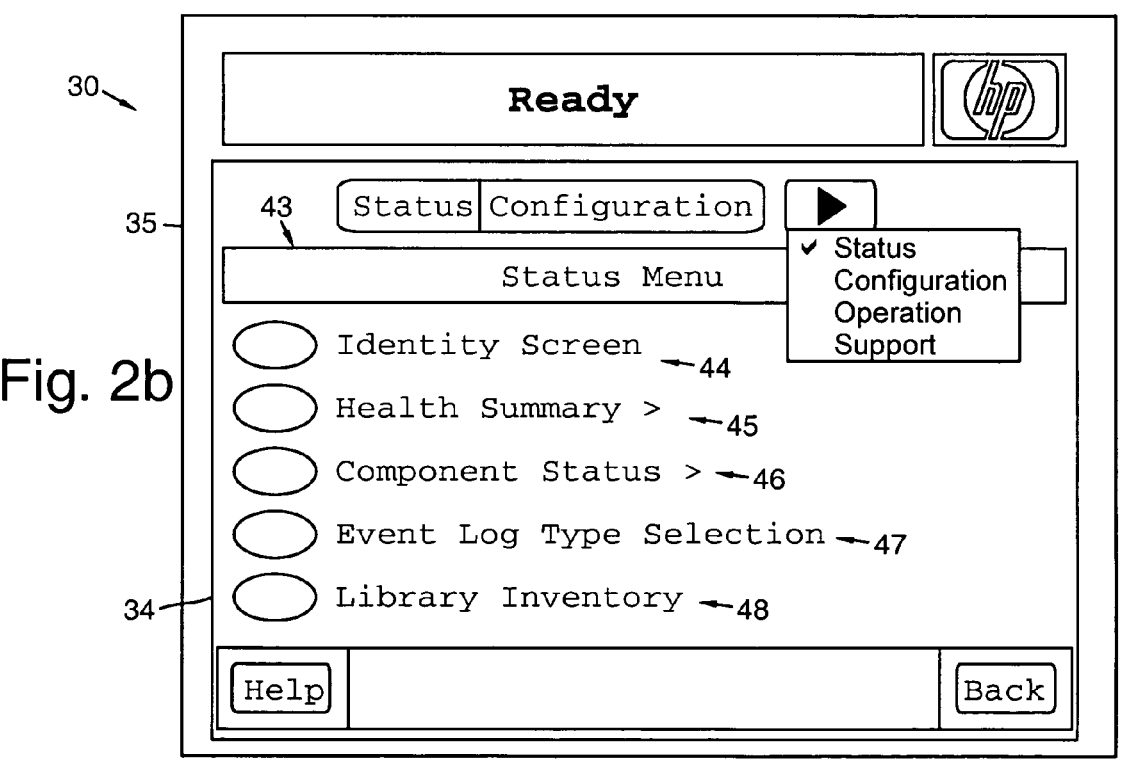
Figure 2C:
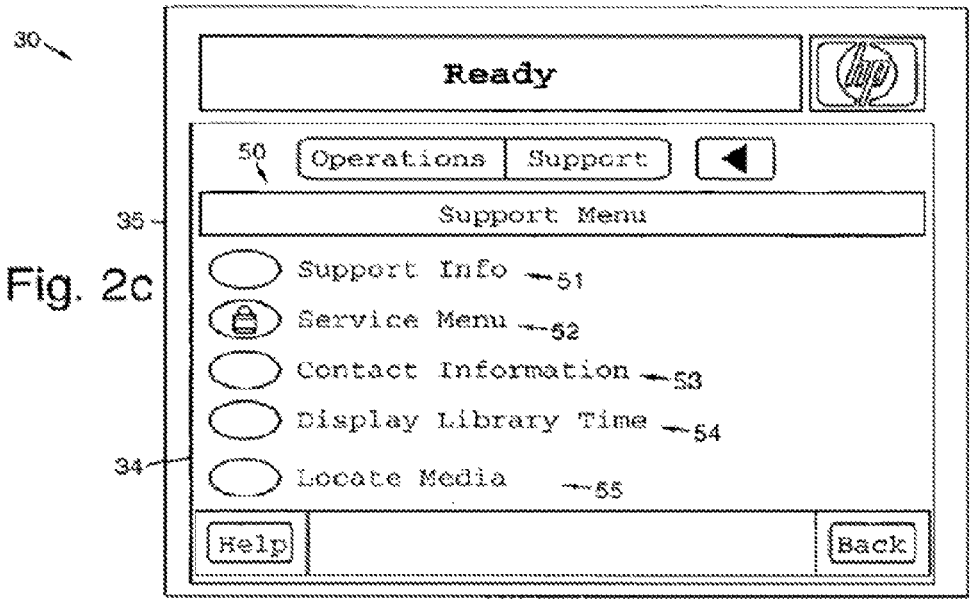
Figure 2D:
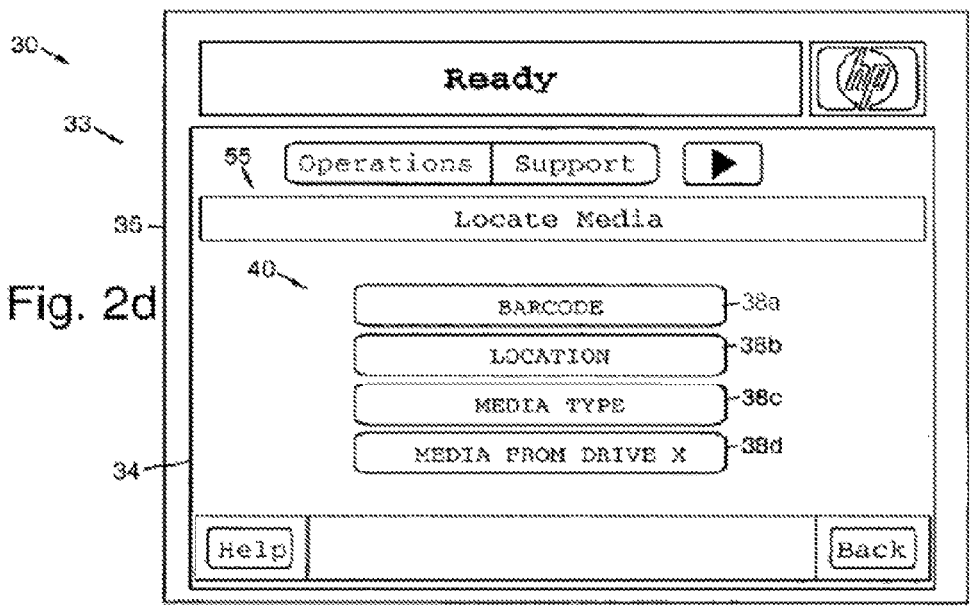

FIGS. 2a-2d show exemplary screen displays 34 that may be displayed on a backup storage device 10, such as a tape library 10, for example. Certain of the exemplary screen displays 34 specifically relate to a media locating function (FIGS. 2b-2d). FIG. 2d illustrates an exemplary user interface that allows a user to locate media contained in backup storage apparatus using various characteristics associated with the media. While media characteristics may readily be used to locate media, it is to be understood that corresponding characteristics or information associated with other components, such as drives or storage devices, or interface controllers, for example, may be employed to locate them as well. The exemplary screen displays 34 and inventory mode function may be presented on a display screen 35 of the operator control panel 30.

The exemplary media locating function is implemented by way of a Support menu 50 that is one menu of a menu structure or tree. The operator control panel 30 has a menu structure that has many paths, such as is illustrated by multiple menus shown in FIGS. 2b-2d, of which the Support menu 50 is but one.

FIG. 2a shows an exemplary screen display 34 comprising an initial splash screen 41 showing a logo. Touching the screen display 34 takes the user of a subsequent screen display 34, shown in FIG. 2b.

The screen display 34 shown in FIG. 2b may be used to present Status, Configuration, Operation and Support information to the user. The user may display the information contained in the Status, Configuration, Operation and Support menus by clicking on the appropriate button at the top of the screen, or by clicking on the right pointing arrow to select one of the screens that is not yet displayed (Operation and Support screens, in this case).

FIG. 2b illustrates an exemplary Status menu 43, which is displayed by clicking on the Status button at the top of the display screen 35, or by migrating to this screen using the right pointing arrow shown in FIG. 2b. The Status menu 43 shown in FIG. 2b allows the user to see an identity screen 44, see a health summary screen 45, determine component status 46, perform event log type selection 47, and perform a library inventory 48, for example.

FIG. 2c illustrates an exemplary Support menu 50, which is displayed by clicking on the Support button at the top of the screen shown in FIG. 2b, or by migrating to this screen using the right pointing arrow. The Support menu 50 shown in FIG. 2c allows the user to access support information 51, access a service menu 52, obtain contact information 53, display library time 54, and locate media 55, for example. Clicking on the locate media icon 55, or banner 55, presents the display 34 shown in FIG. 2d.

FIG. 2d illustrates a display screen 34 comprising a media location screen 34, and particularly illustrates an exemplary user interface 40 that allows a user to locate media 13 contained in backup storage apparatus 10 using various characteristics associated with the media 13. The user interface 40 allows a user to locate media 13 using a variety of characteristics such as barcode 38a, media ID 38b, media type 38c, media from drive X 38d, and the like, instead of locating the media 13 only using its physical location. It is to be understood that various media characteristics may be used, such as serial number, manufacturer, date manufactured, for example, and that the list shown in FIG. 2d is not to be considered exhaustive.

Selecting a particular icon 38a-38d corresponding to the various media characteristics allows a user to enter a particular media characteristic. The user interface 40 implements an algorithm that returns the media location based upon the selected media characteristic. The media location information that is returned and displayed identifies the physical location of the media corresponding to the characteristic. By way of example, to locate media by its characteristic, each characteristic screen might have additional "asistance" tools. To locate by barcode, a screen with a blank for a user entry and "locate barcode that [ ] contains, [ ] starts with, [ ]ends with", each of which would use that value and possibly a search alphabetically which would bring up "starts with 0-9 or A-Z?" then bring up a list of barcodes that match that, and "next character is 0-9 or A-Z" etc. to filter that list. To locate by location might bring up a different type search, for example, such as "Cabinet [ ], module [ ], slot [ ], SCSI element [ ]" with possible searching similar to that discussed above. To locate by media type might display a list of all media types installed "SDLT or LTO" or "SDLT or 600" and "LTO 1, 2, or 3" or "SDLT 320, SDLT 600 [ ], LTO 1 [ ], LTO 2 [ ], LTO3 [ ], Cleaning." Finally, to locate media from drive X might display a list of the last 10 tapes used in that drive, for example.

Each tape library 10 maintains a table of information with records for each storage device 12 in the library 10. The record for each storage device 12 contains information on what is in that element. A structure similar to this is required to be built or maintained to support SCSI "Read Element Status" so all tape libraries have most of the infrastructure available.

The tape library 10 sometimes includes barcode information in a data record for storage devices 12 that contain tape cartridges 13. The library 10 may also include information about what type of tape cartridge 13 is in the storage devices 12 in the library 10. It is not believed that any conventional libraries track other media information such as media identifier, percentage full, last drive. In the present tape library 10 (or backup storage apparatus 10), those characteristics are added to the data record for each element. All functions of the operator control panel 30 that access tape cartridges 13 add a new option that lists different ways of addressing the tape cartridges 13. That list includes barcode and tape type at a minimum, but also preferably includes percent used (% used), media ID or serial number, last drive number, last drive serial number along with other possible fields.

The user interface 40 thus allows a user to locate and use a tape cartridge 13 using any of the tape characteristics that can be used to locate a particular tape cartridge 13 instead of requiring the user to use a software tool to figure out where a specific tape cartridge 13 is before it is accessed.

The user interface 40 allows media 13, such as tape cartridges 13, disposed in a tape library 10, to be easily identified and located and which is compatible with independent software vendor (ISV) software that runs on a host server connected via the Fibre Channel fabric 26 (Fiber Channel SCSI), parallel SCSI, or other high speed data interface to the storage apparatus 10, for example. This makes it easy to locate a tape cartridge 13, for example, that matches an ISV software's request, and allows the use of the same identifier that the ISV software uses when selecting media from a control panel (or other user interface) of the tape library 10. For example, a web-based graphical user interface (GUI), for example, may be employed instead or in addition to the operator control panel interface. The user interface 40 allows selection of media 13 (tape cartridge 13) using its barcode or type.

FIG. 3 is a flow diagram that illustrates an exemplary method 60 or algorithm 60 for use in the backup storage apparatus 10. The exemplary method 60 or algorithm 60 may be used with storage apparatus 10 such as magnetic tape libraries, optical drives and hard disk drives, for example, although it is described with reference to use with a tape library 10. The exemplary method 60 or algorithm 60 comprises the following actions.

A tape library 10 (backup storage apparatus 10) is implemented 61 or provided 61 that comprises a controller 17 that controls and monitors a robotics assembly 14 that loads and unloads tape cartridges 13 into and from tape drives 12, and an operator control panel 30 coupled to the controller 17 for controlling functions of and displaying information regarding the tape library 10.

The operator control panel 30 is configured 62 to have a user interface 40 that is displayed on its display 32 that is operative to locate media 13 using predetermined storage media characteristics including barcode, media type, media from drive X, physical location, percentage used, media ID or serial number, last drive number, and last drive serial number.

A user interacts with the user interface 40 to input 63 or select 63 a media locating characteristic that is to be used to locate tape cartridges 13 in the tape library 10. The user inputs 64 or selects 64 the characteristic, such as via the operator control panel 30. The user interface 40 retrieves 65 the location of the desired tape cartridge 13, or cartridge, 13, corresponding to the characteristic that was input or selected. The user interface 40 displays the retrieved storage media location or locations.

Thus, an improved tape library and information sharing method or algorithm have been disclosed that locate media based upon characteristics. It is to be understood that the above-described embodiments are merely illustrative of some of the many specific embodiments that represent applications of the principles described herein. Clearly, numerous and other arrangements can be readily devised by those skilled in the art without departing from the scope of the invention.

What is claimed is:

1. Apparatus comprising:
   a controller for controlling and monitoring a robotics assembly that loads and unloads storage media into and from storage devices;
   an operator control panel coupled to the controller for controlling functions of and displaying information regarding the apparatus; and
   a user interface displayable on the operator control panel that is operative to input a storage media characteristic, identify storage media locations based on the input storage media characteristic, and display the identity of the corresponding storage media locations.

2. The apparatus recited in claim 1 wherein the characteristic is selected from a group including barcode, media type, media from a particular drive, physical location, percentage used, media identification (ID), media serial number, last drive number, and last drive serial number.

3. The apparatus recited in claim 1 wherein the characteristic is selected using the operator control panel.

4. The apparatus recited in claim 1 wherein the characteristic is used to locate the storage media without using a physical location of the storage media.

5. The apparatus recited in claim 1 wherein the characteristic is a property of the storage media.

6. The apparatus recited in claim 5 wherein the property of the storage media is media type or percentage used.

7. Apparatus comprising:
   controller means for controlling and monitoring a robotics assembly that loads and unloads storage media into and from at least one storage device;
   an operator control means coupled to the controller means for controlling functions of and displaying information regarding the apparatus;
   user interface means displayable on the operator control panel that is operative to input a storage media characteristic, retrieve identity of storage media locations having the storage media characteristic, and display the identity of the retrieved storage media locations.

8. The apparatus recited in claim 7 wherein the characteristic is selected from a group including barcode, media type, media from a particular drive, physical location, percentage used, media identification (ID), media serial number, last drive number, and last drive serial number.

9. The apparatus recited in claim 7 wherein the characteristic is selected using the operator control panel.

10. The apparatus recited in claim 7 wherein the characteristic is used to locate the storage media without using a physical location of the storage media.

11. The apparatus recited in claim 7 wherein the characteristic is a property of the storage media.

12. The apparatus recited in claim 11 wherein the property of the storage media is media type or percentage used.

13. A storage media locating method comprising:
   providing a backup storage apparatus comprising a controller for controlling and monitoring a robotics assembly that loads and unloads storage media into and from at least one storage device, and an operator control panel coupled to the controller for controlling functions of and displaying information regarding the apparatus;
   configuring the operator control panel to have a user interface that is operative to retrieve and display storage media locations corresponding to a storage media characteristic that is input;
   inputting a desired storage media characteristic;
   retrieving the storage media locations having the storage media characteristic; and
   displaying the retrieved storage media locations.

14. The method recited in claim 13 wherein the characteristic is selected from a group including barcode, media type, media from a particular drive, physical location, percentage used, media identification (ID), media serial number, last drive number, and last drive serial number.

15. The method recited in claim 13 wherein the characteristic is selected using the user interface.

16. The method recited in claim 13 further comprising returning locations of storage media based on the storage media characteristic without using a physical location of the storage media.

17. The method recited in claim 13 further comprising:
   searching for storage media based on the storage media characteristic; and
   listing matches.

18. The method recited in claim 17 further comprising filtering the matches.

19. The method recited in claim 13 further comprising maintaining a table of information with records for each storage device.

* * * * *

UNITED STATES PATENT AND TRADEMARK OFFICE
CERTIFICATE OF CORRECTION

| | |
|---|---|
| PATENT NO. | : 7,941,596 B2 |
| APPLICATION NO. | : 11/259223 |
| DATED | : May 10, 2011 |
| INVENTOR(S) | : Curtis C. Ballard et al. |

It is certified that error appears in the above-identified patent and that said Letters Patent is hereby corrected as shown below:

In column 4, line 42, delete "or 600" and insert -- 320 or 600 --, therefor.

Signed and Sealed this
Eighth Day of November, 2011

David J. Kappos
*Director of the United States Patent and Trademark Office*